US010235429B2

United States Patent
Meehan et al.

(10) Patent No.: US 10,235,429 B2
(45) Date of Patent: Mar. 19, 2019

(54) SYSTEM AND METHOD FOR ORGANIZING DATA IN A DYNAMIC USER-CUSTOMIZABLE INTERFACE FOR SEARCH AND DISPLAY

(76) Inventors: Stephen W. Meehan, Burnaby State (CA); Leonore Herzenberg, Stanford, CA (US); Stephan M. Weissman, Dordogne (FR)

( * ) Notice: Subject to any disclaimer, the term of this patent is extended or adjusted under 35 U.S.C. 154(b) by 0 days.

(21) Appl. No.: 12/195,164

(22) Filed: Aug. 20, 2008

(65) Prior Publication Data

US 2009/0327240 A1 Dec. 31, 2009

Related U.S. Application Data

(60) Provisional application No. 60/956,803, filed on Aug. 20, 2007.

(51) Int. Cl.
G06F 17/30 (2006.01)
(52) U.S. Cl.
CPC .............................. G06F 17/30554 (2013.01)
(58) Field of Classification Search
CPC .................................................. G06F 17/30625
USPC ........................................................ 707/758
See application file for complete search history.

(56) References Cited

U.S. PATENT DOCUMENTS

| | | | | |
|---|---|---|---|---|
| 6,631,497 | B1* | 10/2003 | Jamshidi et al. | 715/205 |
| 2003/0055776 | A1* | 3/2003 | Samuelson | 705/37 |
| 2003/0105771 | A1* | 6/2003 | Tiefenbrun et al. | 707/103 R |
| 2004/0133572 | A1* | 7/2004 | Bailey | G06F 17/30595 707/3 |
| 2005/0044110 | A1* | 2/2005 | Herzenberg | G06F 19/28 707/104.1 |
| 2006/0069696 | A1* | 3/2006 | Becker et al. | 707/102 |
| 2006/0075013 | A1 | 4/2006 | Hite et al. | |
| 2006/0174216 | A1* | 8/2006 | Peterson | G06F 17/30067 715/853 |
| 2007/0220415 | A1* | 9/2007 | Cheng et al. | 715/503 |
| 2008/0046838 | A1* | 2/2008 | Haub et al. | 715/810 |
| 2008/0208624 | A1* | 8/2008 | Morita et al. | 705/2 |
| 2010/0211564 | A1* | 8/2010 | Cohen | G06F 17/30864 707/722 |

\* cited by examiner

Primary Examiner — Neveen Abel Jalil
Assistant Examiner — Dawaune A Conyers
(74) Attorney, Agent, or Firm — McCarter & English LLP; Beverly W. Lubit

(57) ABSTRACT

The invention describes a system and method for searching, organizing and displaying information in a user-specified flexible context that enables users to create customized hierarchical views and groupings. The formats for acquiring search results may be stored so that they may be re-applied to the same data or any similarly structured data in subsequent sessions.

41 Claims, 6 Drawing Sheets

| Find/filter Reagent lot(s) | | |
|---|---|---|
| Column name | Operator | Search value |
| See more | | |
| SKU | | |
| Epitope | | |
| Color/handle | not starts with | flourescein (FITC) |
| Product name | ends with | |
| Antibody clone | not ends with | |
| Ab source species | starts with | |
| IgH Isotype | not starts with | |
| IgL Isotype | >, >=, <, <= | a operator to filter on |
| Species detected | | |
| Known NON reactivities | | |
| Received ul | | |

Viewing 0 of 47 Reagent lot(s)

☐ Remove filter ⟷ Apply filter | Find | ✕ Cancel

SYSTEM AND METHOD FOR ORGANIZING DATA IN A DYNAMIC USER-CUSTOMIZABLE INTERFACE FOR SEARCH AND DISPLAY

CROSS-REFERENCE TO RELATED APPLICATIONS

This application claims the benefit of U.S. Provisional Application No. 60/956,803, filed Aug. 20, 2007, which is incorporated herein by reference in its entirety.

FIELD OF THE INVENTION

The invention relates to the field of customizable and personalized systems and methods of organizing, displaying and finding data using such systems and methods.

BACKGROUND OF THE INVENTION

The increases in data generation have prompted the development of various products and systems of data management. The typical data organization system allows a user to display and view data in a table, a navigation tree, or some combination thereof. The standard way of locating an item in a collection of items is by searching the collection to find matches for text that is entered by the user. Another standard way of locating items is to use sequentially displayed options to progressively subset the data until the desired target(s) are listed in the display. That is, the choice of an option triggers display of a new set of options that are more restricted and detailed, and thus putatively enable the user to come closer to locating the desired target(s). This subsetting process, like the "search string" process, usually results in one or a chain of links to a set of desired items that can be displayed. In Internet based systems, this chain is composed of a series of URLs sometimes recorded as a single URL with forward slashes (/) separating each successive link. Sometimes, options that have been selected at each point are highlighted or otherwise marked. However, it is a common experience in searching such systems to be faced with the frustration of being unable to readily move backward and forward along the chain in order to go down a different path, to retraverse a previous path, or to display and compare two or more items located by traversing partially different paths during the search. In addition, because these paths commonly are volatile, it is a common experience to encounter difficulties in reproducing a path because one or more options selected along the way has been forgotten.

A table uses columns and rows to organize data information, such as, but not limited to, numbers, words, formulas, symbols, pictures and other objects that can be sorted, partially or fully displayed, and searched. For example, programs such as Microsoft Excel® organize numerical and alphanumerical data in such a table format.

The term "navigation tree" as used herein refers to a hierarchal structure that allows a user to go from one point to another. A tree structure is an algorithm for placing and locating data originating from any data source expressible in tabular form. The algorithm finds data by repeatedly making choices at decision points called nodes. A node can have as few as one branch or as many branches needed to represent the data. The structure is straightforward, but in terms of the number of nodes and children, a tree can be enormous. The starting point of a tree is referred to as the "root." The maximum number of children per node is referred to as the "order of the tree." The maximum number of access operations required to reach the desired record is referred to as the "depth." In some trees, the order is the same at every node and the depth is the same for every record. This type of structure is said to be "balanced." Other trees have varying numbers of children per node, and different records might lie at different depths. In such cases, the tree is said to have an "unbalanced" or "asymmetrical" structure. Microsoft's Windows Explorer®, for example, allows users to view their file systems and files through navigation trees.

Some programs, such as Microsoft Access®, organize data in a table/navigation tree format. There, a user can create relationships between tables to build a navigation tree, thereby combining a navigation tree's hierarchal structure with the display of a table. However, the user has to go through a long process to match information in separate tables and then create relationships. After these have been created, in order for the user to customize them, the user would have to create new relationships and new tables to get the results the user desires. Generally, users do not have permission to do the necessary manipulations.

Similar features have been incorporated into various e-commerce websites, such as Home Depot's® website. Generally any attempt to customize such e-commerce websites would be onerous, time consuming and complicated. In an e-commerce setting, the task of navigating through web pages to find a certain product or source of information often is cumbersome. The largely static pages are designed by developers to appeal to the broadest consumer base targeted by a particular set of items/information. Frequently, the pages are not displayed in a format or order that is most agreeable or useful to any particular user. Consequently, repeat customers must go through the process of searching for specific products or information each time they seek to purchase a product. Although some companies, such as Amazon®, can display related items and prior purchases, the user cannot determine what items are to be considered related. Furthermore, the user cannot determine the order at which the options at a given subsetting step are displayed, or the order of the steps that are performed.

Unlike existing table and tree-based systems that are designed to prevent a user from customizing his/her experience as he/she may wish, the instant invention provides a quick and easy-to-customize system and method for searching and organizing data. This system and method replaces current ways of locating items in collections, including but not limited to, items recorded in databases, knowledge bases, flat files or any combination thereof. The present invention replaces the current search-string and progressive option-display mechanisms with one that enables all relevant items to be displayed in a uniquely functional tree-table that may be readily and rapidly customized by users to restrict (subset) progressively the data in a way that enables selective displays of target items and information about them. Each row of the table contains all of the information the user wishes to, or is able to, include. Each column contains a specified type of information (data) for the items in at least one row.

SUMMARY OF THE INVENTION

The invention describes a system and method for searching, organizing and displaying information in a user-specified flexible context that enables users to create customized hierarchical views and groupings. The formats for acquiring search results may be stored so that they may be re-applied to the same data or any similarly structured data in subsequent sessions.

According to one aspect, the invention provides a system for searching and organizing data according to parameters customized by a user, comprising (a) a table containing search results information obtained from a search of data in a data repository, wherein the first table comprises at least one row and at least one column, and wherein each column represents a data field of the information, and (b) at least one navigation tree, wherein at least one column of the table is added by the user to the navigation tree; and wherein the navigation tree comprises at least one node for each distinct data entry of information in the at least one column of the table. According to one embodiment of the system, at least one column is added to the navigation tree by the user. According to another embodiment, the data repository is selected from the group consisting of a database, a knowledge base, a text file, a spreadsheet, a table, a matrix, a group of image files, and any combination thereof. According to another embodiment, at least one node is in at least one level in the navigation tree. According to another embodiment, at least one node in the navigation tree is displayed in a customized order. According to another embodiment, at least one tab is created from at least one distinct data entry in at least one column. According to another embodiment, a plurality of the columns in the table is concatenated into a string to create a tab. According to another embodiment, at least one distinct data entry is abbreviated by a user. According to another embodiment, a plurality of the columns in the table is concatenated into a string by the user to create the navigation tree. According to another embodiment, formats for acquiring the search results created during a session are stored on the client. According to another embodiment, formats for acquiring the search results created during a session are stored on the server. According to another embodiment, formats for acquiring the search results created during a session are stored on the client and the server. According to another embodiment, formats for acquiring the search results created during a session are available in successive sessions.

According to another aspect, the invention provides a method for system for searching and organizing data according to parameters customized by a user, the method comprising the steps: querying data from a data repository to obtain search results information, (b) displaying the search results information obtained in step (a) in a customizable search interface, wherein the customizable search interface comprises a table comprising at least one row and at least one column, (c) adding the at least one column in the table to a navigation tree whereby each column in the table represents a distinct data entry of the search information in the navigation tree; and (d) creating at least one node in the navigation tree from each distinct data entry in the at least one column of the table. According to one embodiment of the method, the first data repository in step (a) is selected from the group comprising, a database, a knowledge base, a text file, a spreadsheet, a table, a matrix, a group of image files, and any combination thereof. According to another embodiment, the at least one node is displayed in at least one level in the navigation tree. According to another embodiment, the method further comprises the steps of creating a plurality of nodes, and customizing an order of display for the plurality of nodes in the navigation tree. According to another embodiment, the method further comprises the step of creating at least one tab from the at least one distinct data entry from the at least one column. According to another embodiment, the method further comprises the step of concatenating a plurality of the columns in the table into a string to create a tab. According to another embodiment, the method further comprises the step of abbreviating at least one distinct data entry. According to another embodiment, the method further comprises the step of concatenating a plurality of the columns in the table into a string by the user to create the navigation tree. According to another embodiment, the method further comprises the step of storing on the client formats for acquiring the search results created during a session. According to another embodiment, the method further comprises the step of storing on the server formats for acquiring the search results created during a session. According to another embodiment, the method further comprises the step of storing on the client and the server formats for acquiring the search results created during a session. According to another embodiment, the method further comprises the step of accessing in successive sessions the formats for acquiring the search results created during a previous session.

BRIEF DESCRIPTION OF THE DRAWINGS

The drawings are meant to illustrate the principles of the invention and are not therefore to be considered to limit its scope.

FIG. 1 is a screenshot of an embodiment of the system of the invention, with a navigation tree on the left hand side, and a table on the right hand side.

FIG. 5 is a screenshot of an embodiment of a window of the customizable search interface that facilitates population of the navigation tree, the creation of tabs, and searches.

DETAILED DESCRIPTION OF THE INVENTION

Figure 2:
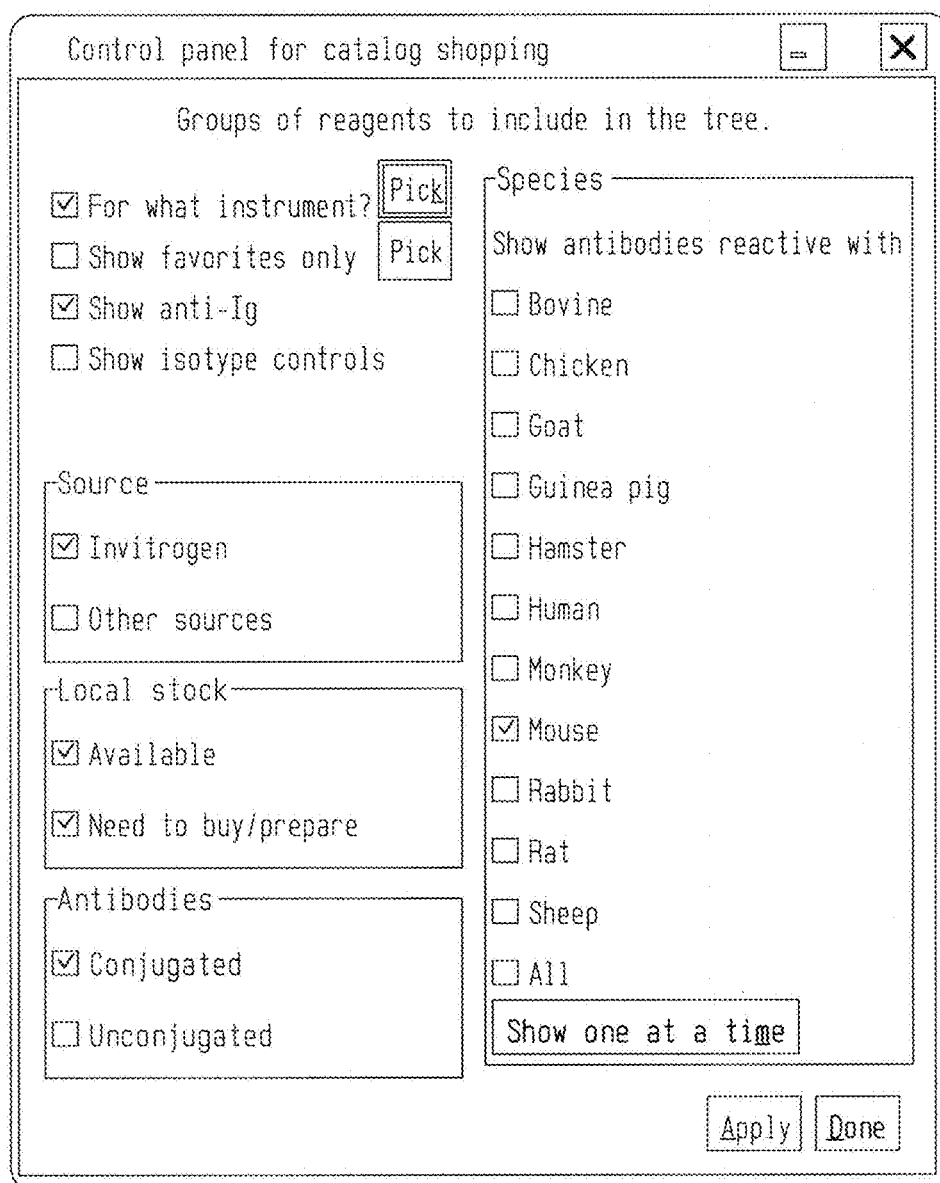
FIG. 2 is a screenshot of an embodiment of a window of the customizable search interface that facilitates the population of the navigation tree, the creation of tabs, and searches.

The term "navigation tree" as used herein refers to a hierarchal structure that allows a user to go from one point in the structure to another.

The term "node" as used herein refers to a point on a navigation tree.

The term "tab" as used herein refers to a selectable portion of an interface.

The term "data repository" as used herein refers to an organized body of related information.

The term "customizable" as used herein refers to the ability to adjust and change the rules in a system to fit a user's personal needs.

The term "client" as used herein refers to an electronic device, including, but not limited to, a personal computer, a cell phone, a personal digital assistant, a wireless-reading device, or a console.

The term "server" as used herein refers to a computer that provides services used by other computers.

The term "session" as used herein refers to a period of time during which a user accesses a website, program, computer system, and the like, beginning with a logon and ending with a logoff.

The phrase "search parameters" as used herein refers to rules that determine what information is displayed from the data repository, and rules that determine how the information is displayed. These rules may be user-defined.

The term "interface" generally refers to a boundary across which two independent systems meet and act on or communicate with each other. The term "search interface" as used herein refers to an interface which displays the results of a search.

The term "catalog" as used herein refers to a list of items with corresponding information.

The term "data cell" refers to a cell in a table. The term "data entry" as used herein refers to data entered in a cell of a table. The term "distinct" as used herein refers to a data entry in a column that may occur more than once in the same column. It is considered one distinct data entry even though the data entry may occur multiple times. This is the equivalent meaning to the reserved word DISTINCT in relational algebra/SQL where the operation SELECT DISTINCT column_name FROM table_name(s) produces a list of unique values for a column name by using only the first occurrence of each value in that column even though it may occur more than once.

The term "hot key" as used herein refers to a key or a combination of keys on a computer keyboard that, when pressed at one time, performs a task.

It is common that when searches are conducted, the searcher does not have a precise view of all the characteristics of the item for which the searcher is searching. Therefore a searcher will want to identify a wide range of choices that can be displayed and then refine the range of choices. Existing systems restrict what is available for display, thus limiting the navigation function. The present invention provides a new approach to navigation function.

Accordingly, the present invention provides a system for searching for, organizing, and displaying data collections of items of any kind that are listed with their properties in a way that enables the searcher to find at least one item that is closest to the criteria for which the user is looking.

Figure 1:
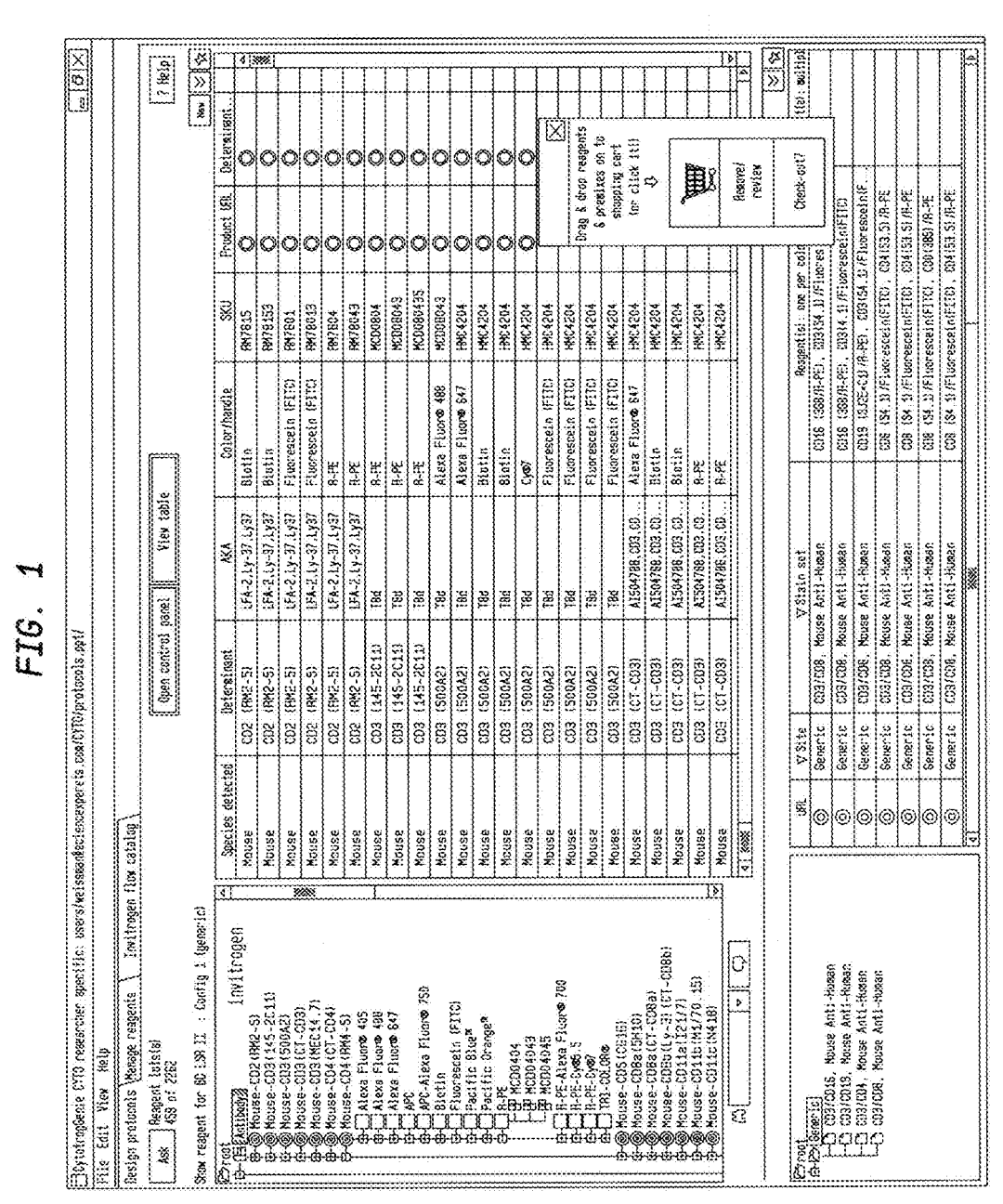

According to one embodiment, the system comprises a customizable first table and a customizable navigation tree, both of which contain information, such that the display shows the user only the rows or nodes in which the user is interested (see, for example, FIG. 1). The first table includes at least one column and one row containing information. The information in at least one column is added to the navigation tree such that a first tree level after the root is formed consisting of one or more nodes. Each node represents a distinct value in that column. For every additional column added to the same navigation tree, the invention creates an additional level in that tree. Higher levels of the tree progressively filter the lower levels.

According to another embodiment, information in at least one column is added to the navigation tree. In some embodiments, the navigation tree is constructed by picking columns from a drop-down list that pops up from the table. In some embodiments, the navigation tree is constructed by highlighting columns in a table and pressing a hot key. In one implementation, the hot key may be one of the function keys on a keyboard, such as F8. In some embodiments, the navigation tree is constructed by dragging the column(s) from the table to the navigation tree. According to another embodiment, at least one column and at least one row load information into the first table from a first data repository. As used herein, the term "data repository" refers to any electronic collection of data that may be organized into columns and rows. Examples of a data repository include, but are not limited to, a database, a knowledge base, a text file, a spreadsheet, a table, a matrix, a group of image files, and the like. In some such embodiments, the first data repository may include items in an inventory as well as data related to or pertaining to those inventoried items, including, but not limited to, product information, such as item numbers, item descriptions, prices, quantity available; URL links to sources of further information about the items and ranking information. In some such embodiments, the data may include catalog or collection information, such as dates of publication, title, author, publisher, wholesaler/distributor, and the like.

According to another embodiment, each column represents a data field of the information. For example, a data repository that contains data on motion pictures may include, but would not be limited to, the following data fields: title, director, writer, actor, genre, rating, runtime, and language. Additionally, each of the data fields may contain more than one entry. For example, an entry for a motion picture may include an entry for several actors featured in the film.

According to another embodiment, at least one node may be created for each cell containing data in the at least one column. A user may create nodes manually for the purpose of navigating the tree. For example, if the table has two columns, a user may create a node corresponding to the distinct data in the cells in one column or for the cells in both columns.

According to another embodiment, at least one node is in at least one level of the navigation tree. Typically, a navigation tree has several levels. The first level typically is called the root, and subsequent levels are denoted by nodes. For example, a navigation tree displaying the contents of an operating system would have the main hard drive as the root, and folders located on the main hard drive as the nodes on the second level. The sub-folders located within the nodes on the second level would create nodes on a third level under each applicable second level node, and so on.

According to another embodiment, the display order of at least two or more nodes in the navigation tree may be customized, meaning that a user may reorder the nodes in any way the user sees fit within that level of the navigation tree. This may be done by dragging a node from one position to another, or by moving an individual node up or down the list of nodes within the same level of in the navigation tree. Additionally, the nodes may be sorted alphabetically, either ascending or descending.

According to another embodiment, at least one node is expanded or contracted upon selection. For example, if a node refers to a product name, all sibling nodes at the same level would be product names. By selecting a single node, or by selecting a designated area, such as a plus sign to the left of the node, all subsets of information/data contained within the next tree level below that node may be displayed in the navigation tree beneath the selected node. Selecting the node a second time would contract the node and display only the node itself, and not the subsets of information/data.

According to another embodiment, the information contained in at least one node may be viewed as a second table. When a user selects a node, the data is loaded into a table. For example, if a table has information on product A and product B, and node 1 contains information on product A, when node 1 is selected, all the information on product A will be loaded into a table.

According to another embodiment, at least one tab may be created from the data in at least one cell from at least one column. In some such embodiments, a table has a plurality of columns. The data in one column is called "product name." The table also has a plurality of rows, such that at least one row is product name "A" and at least one row is product name "B". Product A and product B represent two entries of distinct data; "A" and "B" are distinct entries regardless of how many times in the column these product names repeat in the product name column. In some such embodiments, a tab may be created for either or both of the distinct data entry, such that when selected, a tab created for product "A" will display all information from the table that contains product "A", and a tab created for product "B" will display all information from the table that contains product "B".

According to another embodiment, more than one tab may be created from the distinct data entry values in a column. For example, if a column of a table contains information about price, and the rows contain price data. "1", "2", "3" . . . etc., a tab may be created for the column price. When this tab is selected, all information in that column in the table is displayed.

According to another embodiment, at least one data entry within a column may be abbreviated by a user. The abbreviation automatically is created in a new abbreviation column based on generic row abbreviating logic. Based on this logic, each row of a table may have an automatically generated column value based on a configurable formula that concatenates (meaning to join two character strings end to end) other columns in the same table, thus making the combining of columns, and the making of tabs a simpler process. Thus, a user has the option of specifying to what each abbreviation refers by changing the abbreviation according to the user's own specifications. As a result, the abbreviation provides the user a way of viewing information in the table in shorthand. This is particularly useful if the data entries are long and complex, and a user would prefer a customized shorthand way of viewing this information. The user further may concatenate several columns into a string useful to create a tree or a tab and may use any of the customizations on that concatenation.

Key words also may be used to annotate rows in the table and thereby expand the columns. Thus, a user may define a particular key word/value pair in order to annotate one or more rows in the table. When the user assigns this pair to a row in the table, the invention ensures that there is a column to represent the keyword name and that the cell for the assigned row contains the keyword value within that column. If no column pre-exist the assignment, then the invention expands the table to incorporate this (these) column(s).

According to another embodiment, the invention stores formats for acquiring the results of the search, i.e., for viewing/searching of the data in a location and computer transparent way so that the formats may be re-applied to the same data or any similarly structured data. These formats may be stored on a client, on a server, or on a client and on a server.

According to another embodiment, the navigation tree is available to the user in successive sessions. A user may store formats for acquiring his/her customized navigation tree on the client or the server before ending a session. This allows the user to reapply the formats to the same data or any similarly structured data for each successive session. Thus the customization the user desires is maintained regardless of the location from which the user is accessing the information. This feature permits the user to focus on information that is most relevant to the user's immediate or long term needs.

According to another embodiment, the first table is customizable. Customizable aspects of the first table may include, but are not limited to, column names, column display order, column width, column visibility, row order, and row grouping. The first table also may be customized with functionality, such as the presence of ellipses to represent repeating values.

The term "customizable search order" as used herein refers to an ordering of the information that is customizable by the user unless the order is locked in by the purveyor. The extent of customization available to a user according to the invention is completely flexible. A user may create an order in a list of items, drag and drop the list of items into slots to create the order of the items in a tree, the order of the nodes in the tree, and the columns to display as nodes, and can use any column to make a tab, which subsets the display according to the values in any column the user chooses.

According to another embodiment, the table is searchable using user customized search parameters. The customized search parameters include, but are not limited to, the data repository to search, the specific columns to search, the data to search for within specific columns, and the like. The results of the search are a subset of the information in the data repository.

The present invention further provides a method for searching for and organizing data. The method for organizing data comprises the steps (i) a user sending a request from a client to a server, (ii) the server receiving the request; (iii) the server retrieving data from a first data repository based on the request; (iv) the first data repository sending the data from the server to the client; and (v) the client displaying the data through a customizable search interface, whereby the customizable search interface includes a customizable first table comprising at least one row and at least one column and a customizable navigation tree comprising at least one node.

According to one embodiment, the server, the client, or both the server and the client may comprise a customizable search software. The server comprising this software may gather specific data stored in the data repository upon a request by the user. The client comprising the customizable search software may create personalized portions of the information in the data repository, including, but not limited to, catalogs, groupings and the like. These personalized portions of the information may be transmitted via any connecting technology, including, but not limited to, a local computer network, a wide area network, a local area network, and the like. Additionally, the customizable search software may operate within an internet browser or independent of an internet browser.

According to another embodiment, the method further comprises the step of adding the at least one column of the customizable first table to the customizable navigation tree. In some such embodiments, the at least one column is added to the navigation tree by picking columns from a drop-down list that pops up from the table. In some such embodiments, the at least one column is added to the navigation tree by highlighting columns in the table and pressing a hot key. In one implementation, the hot key may be one of the function keys on a keyboard, such as F8. In some such embodiments, the at least one column is added to the navigation tree by dragging the column from the customizable first table and dropping it into the customizable navigation tree.

According to another embodiment, the method further comprises the step of loading information from a first data repository to the first table. In some such embodiments, the first data repository may be selected from the group consisting of a data repository, a knowledge base, a text file, a spreadsheet, a table, a matrix, a group of image files, and any combination thereof.

According to another embodiment, each column represents a data field of the information. In some such embodiments, the method further comprises the step of creating at least one node from each distinct data entry in the at least one column. In some such embodiments, at least one node is in at least one level in the navigation tree. In some such embodiments, the method further comprises the step of customizing the display order of at least one node in the navigation tree. In some such embodiments, the method further comprises the step of the user expanding or contracting at least one node. In some such embodiments, the method further comprises the step of viewing the information contained in at least one node in a second table. In some such embodiments, the method further comprises the step of creating at least one tab for the at least one distinct data entry from the at least one column. According to another embodiment, the at least one data entry within a column may be abbreviated by a user. The user then may concatenate several columns into a string useful to create a tree or a tab and may use any of the customizations on that concatenation.

According to another embodiment, the method further comprises the step of storing the formats for acquiring the results of the search, i.e., for viewing/searching of the data in a location and computer transparent way, so that the formats may be re-applied to the same data or to any similarly structured data. The formats may be stored on a client, on a server, or on a client and a server. In some such embodiments, the stored formats may be available to the user in successive sessions.

According to another embodiment, the method further includes the step of the user sending his/her selections of the data from the client to the server. For example, in a purchasing context, the user selects information that represents what he/she wants to purchase at the client. That information is sent from the client to the server where the order is processed.

According to another embodiment, the method further includes the step of storing data sent from the first data repository from the server in a second data repository on the client. In some such embodiments, the data stored in the second data repository is accessible to the user while the client and the server are disconnected. In some such embodiments, the method further comprises the step of sending catalog information based on the data stored in the second data repository to the server when the client and the server are reconnected. Examples of catalog information include, but are not limited to, purchase information, directory information, database information, and the like.

According to another embodiment, the method further includes the step of the user selecting a portion of this data and displaying the selected portion of this data in the customizable search interface. In some such embodiments, the method further includes the step of generating an alert for the selected portion of data in the customizable search interface. In some such embodiments, the method further includes the step of notifying the user of data related to the selected data through the alert.

Additionally, the method provides a different paradigm for searching that further comprises the step of conducting a search of the data through the customizable search interface. This method does not comprise the step of constructing a search string. Aspects of the search that may be customized include, but are not limited to, the data repository to search, the specific columns to search, and the data to search for within the specific columns. The results of such a search are a subset of the information in the data repository. Here, search arguments are based upon user-specified fields so that particular information is pinpointed via a search functionality customized for the user.

According to another embodiment, the method further comprises the step of the user generating search parameters. In some such embodiments, the method further comprises the step of loading, either manually or automatically, the formats for acquiring the results of the search into the customizable search interface upon future sessions. Because the formats are stored on the client, the server, or both the client and the server, the user has his/her own customized experience each time he/she accesses the data. In a commercial setting, this may increase the return rate for customers by providing them with the advantage of a product catalog that appeals to their particular needs. The invention stores the user's preferences in a location transparent way so that the user need not use the same server to have his/her search preferences remembered.

According to another embodiment, the user may choose to display any subsection of the data. As a nonlimiting example, a user may choose to display only certain columns of data in the first table. In some such embodiments, the data comprises catalog information, wherein the catalog information contains information on several products. In some such embodiments, the method further includes the step of gathering information on similar products from different sellers in the customizable search interface. The system may be designed whereby a user's customization of a catalog for one seller may be integrated with customized user catalogs for other sellers. In this manner, the user may create a combined personal catalog representing products from multiple sellers. The user's personal catalog then may interface with the user's inventory control system so that the user may more clearly see when inventory of a particular product is low and must be repurchased.

The invention has a mechanism general to any data type, not just inventory, whereby a user indicates his/her interest or need to be notified of any changes to specific data cells found in the user's personalized view of any first table. The invention negotiates a publish and subscribe event notification interface with the plugged-in data repository. The data repository receives subscriptions from the inventions to watch for alterations to a specific data cell. When alterations occur, the data repository publishes notice of change back through the invention, and the user may see which item has changed. Thus, in the context of inventory, the user would subscribe to see changes in "amount on hand" data cells whenever they fall below a certain number. Additionally, the invention interacts with the data repository to determine row-level and column-level security.

The invention has universal applicability. For example, the system may be used by any seller of goods that can or does organize its products in a catalog. In addition, it may be used to search and organize collections of data, such as library contents, newspaper archives, blog entry archives, corporate records, attorney templates, patent records, medical records, and the like.

In one implementation, the information in the table is defined by an external source such as a library or a merchant and cannot be edited by the user. In other implementations, the information is supplied wholly or in part by the user. In editable implementations, the user may evoke utilities that guide the entry of information into the table or perform queries that load information from external sources. The user also may create a table column that facilities row identification by invoking a utility that operates on each table row to concatenate the contents of several columns in a specified order and to insert the concatenated string for each row in the column created for this purpose. With this utility, the user may specify whether the concatenated string contains the full contents of each of the specified columns, unique abbreviations generated automatically for the contents in each of the specified columns, or user-supplied aliases or abbreviations. The user also may edit or replace any of the concatenated entries.

The user may define the order that the columns are displayed in the table and may sort the rows of the table according to the contents of a column or ordered set of columns. The desired sort order (ascending, descending, user-specified) for each column may be defined independently.

The data in each column may be used to subset the items (rows) in the table. When condensed to represent the distinct data entries in the column, each column constitutes a set of options available to restrict display to subsets of items in the table. The user may combine any set of columns in the table, in any order, to create a multilevel tree whose nodes hierarchically display the options defined by the data in the chosen columns. Data in the remaining columns are displayed in the original table format alongside the tree. The user may manipulate the tree to dynamically control the display of the information in the table columns by selecting any combination of options (nodes), contiguous or discontiguous, displayed in the tree. The selected options determine the table rows that are displayed. Thus, the user selects the information and the order of the information displayed in the tree and uses the tree to select the information displayed in the table.

Depending on the implementation of the table and the type of information in it, the user may select desired items either by selecting the table row containing the item or by selecting a cell that identifies the item. The user also may invoke utilities that can export information about the selected item(s) to purchasing, "click-counting", printing, emailing or other software designed to receive and utilize such information.

The user also may deploy the options defined by the distinct data entries in a column to create a set of subtables (subsets of the table rows). One subtable will be created for each option in the column. The subtables may be displayed as tree-tables that may be manipulated independently but remain integrated in a single underlying parent table. The user may choose to (re)display the parent table at any time. In one implementation, the subtables may be displayed as a stack in which they appear to be located one behind the other.

The options (or aliases thereof) that are contained in the column that the user selects to create a set of subtables may displayed in a series of "tabs" at the upper border of the stacked subtables. The tab for each table will be labeled with the option that defines its contents. The tabs may be used to select and identify the subtable that appears on the top of the virtual stack. Any column, including those that contain concatenations of the contents of other columns, may be used to create tabs.

Unless defined otherwise, all technical terms used herein have the same meaning as commonly understood by one of ordinary skill in the art to which this invention belongs. Any methods and materials similar or equivalent to those described herein also can be used in the practice or testing of the present invention It must be noted that as used herein and in the appended claims, the singular forms "a", "and", and "the" include plural references unless the context clearly dictates otherwise.

EXAMPLES

The following examples are put forth so as to provide those of ordinary skill in the art with a complete disclosure and description of how to make and use the present invention, and are not intended to limit the scope of what the inventors regard as their invention.

Example 1—A Flow Cytometry Reagent Catalog

A life science reagent catalog may have an experiment protocol design module that accesses and uses items and information about the items in the catalog for the purpose of composing a feasible set of catalog items to satisfy the needs of a scientific experiment. This module may supplement the catalog with constraints that condition the display and potential for selection of reagents in accordance with the rules of feasible experiment design.

The system may enable setting of groups of parameters that collectively enable creation of unlimited and overlapping views and/or groupings of catalog items. The system may provide a variety of interfaces that allow users to integrate rule-based decision-making, programmatic inputs, filters, and other focus tools in ways that shape the content, formatting, and other aspects of both trees and tables. FIG. 2 shows an illustrative embodiment. In some such catalogs of flow cytometry reagents, a control panel may allow the user to restrict the display of reagents to those that will work with a selected flow cytometry instrument configuration as determined by pre-set rules. The same or other control panel may allow the user to further restrict the display of reagents to those with other characteristics, including, but not limited to, the species of animal cells that the reagents target.

Figure 3:
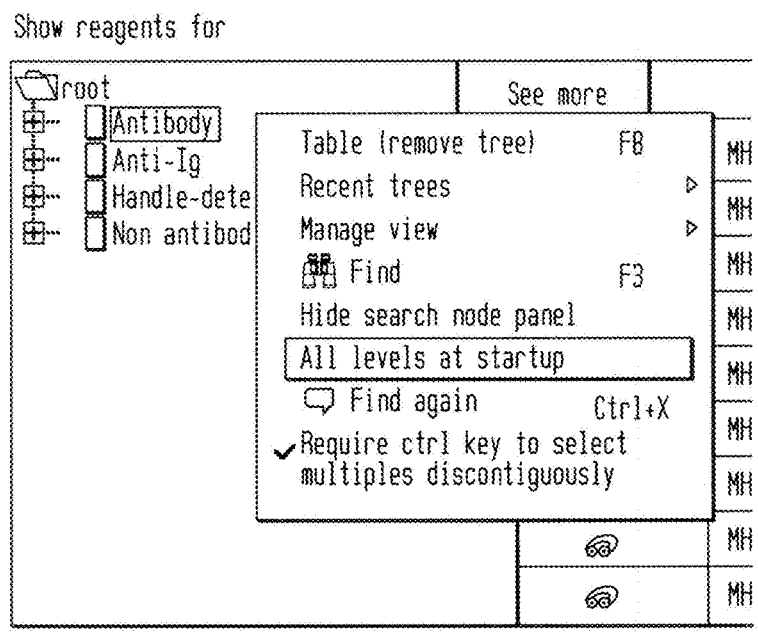
FIG. 3 is a screenshot of an embodiment of the options available when right-clicking over a node of the navigation tree.
Figure 4:
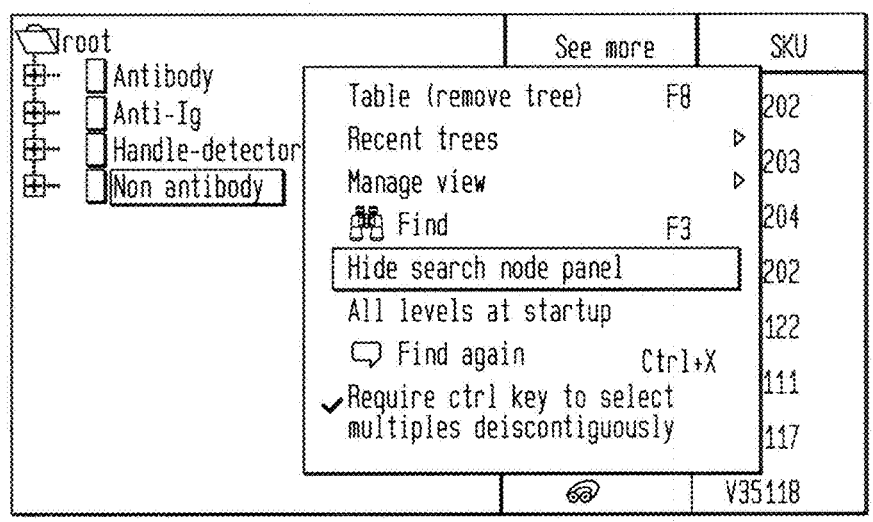
FIG. 4 is a screenshot of an embodiment of the options available when right-clicking over a node of the navigation tree.

A separate or integrated Focus Defining Utility further may offer the user a set of selectable operators and values whose settings collectively define a view, and can offer the user the ability to name, store and reference this view. FIG. 3 and FIG. 4 show illustrative embodiments.

Figure 6:
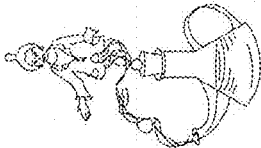
FIG. 6 is a screenshot of an embodiment of a window of the customizable search interface where a user can order products or information from the server.

Information on available flow cytometry regents may be obtained from a plurality of reagent suppliers, for example, by creating a database that contains information on all available reagents, regardless of the supply source. FIG. 1 shows an illustrative embodiment. The user may make a set of queries, and the output of these queries is put into a table such that each column would comprise a field of data, such as supplier, species detected, determinant, AKA, fluorochrome color, SKU, and product URL, and each row would contain information about a particular reagent. FIG. 6 shows an illustrative embodiment. At least one field of data may be displayed for each reagent, and the user may add any of the columns to a customizable navigation tree. The navigation tree would display a node for each reagent contained in the column. The user may create an additional level of nodes corresponding to categories that relate to the reagent, such as supplier, species detected, determinant, AKA, fluorochrome color, SKU, and product URL The user may create a preference list so that reagents from supplier X always are displayed first, regents from supplier Y always are displayed second, and so on. The user also may create a tab based on various criteria, and can make as many tabs with whatever combination of information as desired. Once saved, this customized navigation tree always will have the user's favorite supplier on top of the tree.

In the example of a catalog of flow cytometry products, a user may restrict a given view to a grouping of all reagents in a catalog that (a) have one or more specific detection properties, such as color or fluorescence; (b) are known to react with material from one or more target species; and (c) currently are available in local inventory in volumes greater than a specified value.

Example 2. A Library

In a library setting, information on various literary works may be obtained from a data repository, for example, a database that contains information on the library's entire collection. The user may make a set of queries, and the output of these queries is put into a table such that each column of the table would comprise a field of data (such as author, title, publisher, publication date, edition, printing, male characters, female characters, and genre), and each row of the table would contain information on one literary work. To add any of these columns to a navigation tree, the user would select a column, such as author, and use that column to construct a navigation tree. The navigation tree then would display a node for each individual author contained in the column. If the author column contained the names Alexander Dumas, Cervantes, William Shakespeare, and Arthur Miller, there would be one node for Dumas, one for Cervantes, one for Shakespeare, and one for Miller. The user then may create an additional level of nodes corresponding to categories that relate to a particular author, such as, but not limited to, publication date, publisher, fiction or nonfiction, genre, hardcover or paperback. The user then may create a node for each of these categories, which would be placed one level below the author node level in the navigation tree. The user may create additional levels of nodes as he/she sees fit. Furthermore, the user may move the nodes and organize them according to the user's needs. For example, the nodes may be organized alphabetically in ascending order, alphabetically in descending order, or in a random order that reflects the user's preferences, meaning that the user can change the order of the nodes in the navigation tree at a level so the user's favorite is first, the second favorite is second, and so on. For example, if the user's favorite author is Dumas, the user's next favorite author is Shakespeare, and the third favorite author is Miller, the user may order the nodes in the navigation tree so that Dumas always is first, Shakespeare always is second, and Miller always is third. To search for and find information related to author Dumas, the user would select Dumas by clicking that node. When the user selects the Dumas node, all of Dumas' works are displayed in a table. This table would contain all the information of the original table, limited solely to the works of Alexander Dumas. In this way, the user can create a personalized search result for information he/she wants to obtain that the user can save. When accessed in the future, Dumas, the user's favorite author, always be on top for this saved navigation tree, i.e., it does not reset. Even though the user may choose to display only the title and publication date columns corresponding to The Count of Monte Cristo, for example, only the user's selection of information is displayed in this case, while the rest of the information remains in the database.

The user also may create a tab based on various criteria. For example, the user may create a plurality of tabs out of the distinct values in the author column, including an Alexander Dumas tab. When the Alexander Dumas tab is selected, all of the works by Dumas are displayed.

After the user has created a series of his/her customized navigation trees, the user may store any or all of the formats for acquiring the results of the search, i.e., for viewing/searching of the data in a location and computer transparent way so that the formats may be re-applied to the same data or to any similarly structured data. The formats created during the session may be stored on the client, the server, or the client and the server. This feature allows the user to reapply the formats from the previous search(es) to the same data or to any similarly structured data from any client.

Example 3. A Movie Retailer

In a movie retailer setting, information on motion pictures would be obtained from a data repository, for example, a database that contains information on the retailer's entire collection. The user may make a set of queries, and the output of these queries is put into a table such that each column would comprise a field of data, such as, but not limited to, title, year, producer, director, writer, actors, genre, rating, runtime, and language, and each row would contain information on one motion picture. At least one field of data may be displayed for each film—e.g., an entry in the table for the film Casablanca may list, Humphrey Bogart and Ingrid Bergman under the field actor and Drama and Romance under the field genre.

The user may add any of these columns to a navigation tree as follows: The user would select a column, such as actor, and use that column to create the navigation tree. The navigation tree then would display a node for each individual actor contained in the column. Thus, if the column contained the actors Humphrey Bogart, Johnny Depp, and Jack Nicholson, there would be one node for each of these actors. The user may create an additional level of nodes corresponding to categories that relate to an actor's name, such as, but not limited to, title, year, producer, director, writer, genre, rating, runtime, and language. When created by the user, a node for each of these categories would be placed one level below the actor's name level in the navigation tree. The user may create additional levels of nodes as he/she sees fit.

Furthermore, the nodes may be moved and organized according to the user's preferences. For example, as a user sees fit. For example, the nodes may be organized alphabetically in ascending or descending order, or they can be organized in a random order to match a user's desire. For example, if the user's favorite actor is Will Smith, the user's next favorite actor is Johnny Depp, and the third favorite actor is Orlando Bloom, the user may order the nodes in the navigation tree so that Will Smith always is first, Johnny Depp always is second, and Orlando Bloom always is third. When accessed in the future, Will Smith, the user's favorite actor, always be on top for this saved navigation tree, i.e., it does not reset. To search for and find information related to actor Johnny Depp, the user would select Johnny Depp by clicking that node. When the user selects the Johnny Depp node, all of Johnny Depp's movies would be displayed in a table. This table would contain all the information of the original table, limited solely to movies in which Johnny Depp acted. In this way, the user may create a personalized search result for information he/she wants to obtain that the user can save. Even though the user may choose to display only the title and release date columns corresponding to the movie I Robot, for example, only the user's selection of information is displayed in this case, while the rest of the information remains in the database.

The user may create a tab based on various criteria. For example, the user may create a plurality of tabs out of the distinct values in the actor name column, including a Johnny Depp tab. When the tab Johnny Depp is selected, all of motion pictures in which Depp is an actor are displayed.

After the user has created a series of his/her customized navigation trees, the user may store formats for acquiring the results of the search, i.e., for viewing/searching of the data in a location and computer transparent way so that the formats may be re-applied to the same data or to any similarly structured data. The formats created during the session may be stored on the client, the server, or the client and the server. This feature allows the user to re-apply the formats from the previous search(es) to the same data or to any similarly structured data from any client.

Example 4. Department Store

A department store that sells towels, for example, sold by Christies (under brands including, but not limited to, Renaissance, Odyssey, Embrace, Sorrento), WestPoint Home (under brands including, but not limited to, Martex, Grand Patrician, Charisma, Utica, Vellus, Rachael Ray); Springs Global, Inc. (under brands including, but not limited to Wamsutta), where the most profit is made on Martex Towels, may want Martex towels to be number one in any search conducted by a user. The retailer may lock in Martex towels at the top of the tree, or can configure the system so that the customer may make that choice.

Thus, a customer searching for towels may make a set of queries, and the output of these queries is put into a table such that each column of the table would comprise a field of data, such as, but not limited to, color, size, nap length, pattern, manufacturer, distributor, cost, and import/domestic; and each row of the table would correspond to a towel and would display features of the towel in corresponding columns. To add any of these columns to a navigation tree, the customer would select a column, such as color, and use that column to create a navigation tree. The navigation tree then would create a node for each color in the column.

For example, to search for and find information related to pink towels, the user would select pink by clicking that node. When the user selects the pink node, all pink towels would be displayed in a table that would contain all the information that had been in the original table, but limited solely to pink towels. The nodes further may be moved and organized according to the user's needs. Therefore, if the customer wants to search for pink Martex bath towels, the user would pick the manufacturer column and deliver it into the pink node, and the tree would create one node for each manufacturer one level down from the pink node. The user also would pick the size column and deliver it into the Martex manufacturer node and the tree would create one node for each size one level down from the Martex node. For any one saved navigation tree, the user may order the nodes in the navigation tree so that for color, for example, pink always is first, blue always is second, yellow always is third; for brand, Martex is always first, Wamsutta always is second, and Renaissance always is third, and for size, bath always is first, hand always is second, and face always is third. The user may save as many trees as he/she wants.

The user also may create a tab based on various criteria. For example, the customer may create a plurality of tabs out of the distinct values in the brand column, including a Martex tab When the Martex tab is selected, all of the products in the Martex towel line appear in a table. The user may make as many tabs as desired.

After the user has created a series of his/her customized navigation trees, the user may store formats for acquiring the results of the search, i.e., for viewing/searching of the data in a location and computer transparent way so that the formats may be re-applied to the same data or to any similarly structured data. The formats created during the session may be stored on the client, the server, or the client and the server. This feature allows the user to reapply the formats from the previous search(es) to the same data or to any similarly structured data from any client.

Example 5. Telephone Directory

In a telephone directory setting, information on telephone numbers may be obtained from a data repository, for example, a database that contains information on all phone numbers. The user may make a set of queries, and the output of these queries is put into a table for display such that each column of the table would comprise a field of data, such as, but not limited to, country, state, city, last name, first name, phone number; and each row of the table would correspond to information about one telephone number. The table would be set up according to the user's needs.

The user may add any of these columns to a navigation tree. The user would select a column, such as city, and use that column to create a navigation tree. The navigation tree then would display a node for each individual city contained in the column. If the column contained the cities of New York, Chicago, and Los Angeles, there would be one node for each of these cities.

The user may create an additional level of nodes corresponding to categories within a city. A typical directory organized by city may include, but is not limited to, the following categories of information: last name, first name, street address, city, state, zip code, and phone number. The user may create a node for each category which will be placed one level below the city in the navigation tree. The user may create more levels of nodes as he/she sees fit. For example, when the user selects the New York node, the node is expanded to display all phone numbers in this city, and all of New York's phone numbers are displayed in a table. This table would contain all the information of the original table, limited solely to the city of New York. The user may choose to display any selection of columns. For example, the user may choose to display only the last name and phone number; in this case, while the rest of the information remains in the database, only the user's selection of information is displayed.

The user also may create a tab based on the distinct values in one columna. For example, the user may create a plurality of tabs out of the distinct values in the city column, including a Chicago tab. When this tab is selected, all of the phone numbers in Chicago are displayed.

After the user has created a series of his/her customized navigation trees, the user may store formats for acquiring the results of the search, i.e., for viewing/searching of the data in a location and computer transparent way so that the formats may be re-applied to the same data or to any similarly structured data. The formats created during the session may be stored on the client, the server, or the client and the server. This feature allows the user to reapply the formats from the previous search(es) to the same data or to any similarly structured data from any client.

Example 6. Patent Records

In order to perform patent searches, a user may make a list of the columns that he/she would want to extract from available data. For example, the user may want to track at least some of the following: identification number, Application Number, Country, Inventor, Assignee, Filing Date, Related Data, Publication Number, Publication Date, Status, Action due date, Prior Art references (foreign patent, U.S. patent, scientific articles), and time worked. The user may make a set of queries, and the output of these queries is put into a table such that each column of the table would comprise a field of data [such as identification number, Application Number, Country, Inventor, Assignee, Filing Date, Related Data, Publication Number, Publication Date, Status, Action due date, Prior Art references (foreign patent, U.S. patent, scientific articles), and time worked], and each row of the table would contain information on one patent/patent application. To add any of these columns for example, a prior art reference, to a navigation tree, the user would select the prior art reference column, and use that column to create a navigation tree. The navigation tree then would display a node for each individual reference contained in the column. If the user clicks on any node/set of nodes, all rows below that node will be shown. Therefore, if the user clicks on the nodes in the tree to display three prior art references, all the rows that list those three references would be listed in the table. Each reference may be further subsetted by various identification criteria, e.g., U.S. patent, foreign patent, scientific article. The user may create a second navigation tree by inventor, a third navigation tree by related data, a fourth navigation tree by inventor, and may create a client tab. The user may create a plurality of tabs out of the distinct values in the inventor column, including, for example, a Thomas Alva Edison tab. When this tab is selected, all of the data relating to inventions by Thomas Alva Edison are displayed.

After the user has created a series of his/her customized navigation trees, the user may store formats for acquiring the results of the search, i.e., for viewing/searching of the data in a location and computer transparent way so that the formats may be re-applied to the same data or to any similarly structured data. The formats created during the session may be stored on the client, the server, or the client and the server. This feature allows the user to reapply the formats from the previous search(es) to the same data or to any similarly structured data from any client.

While the present invention has been described with reference to the specific embodiments thereof, it should be understood by those skilled in the art that various changes may be made and equivalents may be substituted without departing from the true spirit and scope of the invention. In addition, many modifications may be made to adopt a particular situation, material, composition of matter, process, process step or steps, to the objective spirit and scope of the present invention. All such modifications are intended to be within the scope of the claims appended hereto.

What is claimed is:

1. A method for creating an end-user-customized navigation tree by searching and organizing data collections from data sources according to parameters customized by an end-user, the method comprising:

enabling one or more queries of data from one or more data sources;

displaying search results from the one or more queries in a customizable graphical search interface that includes a table comprising at least one row and a plurality of columns, wherein each column comprises a data field of the search results;

displaying a customizable navigation tree using the customizable graphical search interface;

enabling an end-user to add nodes to the customizable navigation tree and to create levels of the customizable navigation tree by:

receiving an end-user selection of at least one column from the plurality of columns in the displayed table, and, in response to the end-user selection of the at least one column, creating at least one node in a first level of the customizable navigation tree for each distinct entry of data in the selected at least one column, wherein the end-user selection of the at least one column is by dragging the selected at least one column from the table to the navigation tree, or by highlighting the at least one column in the displayed table and indicating a selection of the highlighted at least one column, or by selecting the at least one column from a drop-down list of columns displayed in the table that pops up from the table; and receiving an end-user selection of at least one additional column from the plurality of columns in the displayed table, and in response to the end-user selection of the at least one additional column, creating at least one node in a second level of the customizable navigation tree for each distinct entry of data in the selected at least one additional column, wherein the end-user selection of the at least one additional column is by dragging the selected at least one additional column from the table to the navigation tree, or by highlighting the at least one additional column in the displayed table and indicating a selection of the highlighted at least one additional column, or by selecting the at least one additional column from a drop-down list of columns displayed in the table that pops up from the table; and enabling the end-user to control an order of display of nodes within each level of the customizable navigation tree through the customizable graphical search interface;

optionally saving information regarding an end-user-specified organization of the customizable navigation tree; and when saved, applying the saved information regarding the end-user specified organization of the customizable navigation tree to second search results from an additional one or more queries of the one or more data sources or from one or more queries of one or more second data sources to generate an end-user-customizable navigation tree including the second search results.

2. The method of claim 1, wherein the saved information regarding the end-user-specified organization of the customizable navigation tree includes a saved node; and wherein the method further comprises receiving an end-user selection of the saved node through the customizable graphical search interface, and in response to the end-user selection, displaying a personalized search result of the one or more data sources or of one or more different data sources limited to the data field or data fields associated with the saved node.

3. The method of claim 1, further comprising applying the saved information regarding the end-user specified organization of the customizable navigation tree to updated search results from updated queries of the one or more data sources to generate an end-user-customizable navigation tree including the updated search results.

4. The method of claim 1, further comprising receiving an end-user selection of a node in the customizable navigation tree; and displaying a personalized search result of the one or more data sources limited to the data field associated with the node based on the selected node.

5. The method of claim 1, further comprising:
submitting a further query to one or more second sources based on a selection of search results displayed in the table or the customizable navigation tree or submitting a further query to one or more second sources based on an end-user selection of one or more nodes of the customizable navigation tree, wherein the one or more second sources are the same as or different from the one or more sources;
displaying results of the further query in the table; and
enabling the end-user to organize the results of the further query with results of the one or more queries using the table and/or the customizable navigation tree.

6. The method of claim 1, wherein the one or more data sources include information regarding life sciences reagents, and wherein the method further comprises:
receiving information regarding a desired experimental use of a reagent or reagents through a control panel of the graphical search interface, the information including one or more of the following: an instrument configuration, a species of animal cells that the reagent or reagents target, and whether antibodies are conjugated or unconjugated; and
restricting the data displayed in the table and the customizable navigation tree based on the received information regarding the desired experimental use.

7. The method of claim 6, wherein the received information regarding the desired experimental use includes information regarding a flow cytometry instrument, and wherein restricting the data displayed in the table and the customizable navigation tree based on the received information regarding the desired experimental use comprises restricting the data displayed in the table to information regarding reagents that will work with the flow cytometry instrument as determined by pre-set rules.

8. The method of claim 1, further comprising creating at least one tab from at least one distinct data entry in at least one column of the table.

9. The method of claim 1, further comprising concatenating a plurality of the columns in the table into a string to create a tab.

10. The method of claim 1, further comprising enabling the end-user to abbreviate at least one distinct data entry in the table.

11. The method of claim 1, further comprising storing, on a computing device that generates the graphical user interface, on a client computer in communication with the computing device over a network, or on both, a format for acquiring the search results created during a session.

12. The method of claim 1, further comprising accessing in successive sessions formats and search terms used for acquiring the search results created during a previous session.

13. The method of claim 1, wherein each of the one or more data sources is selected from the group of data repository types consisting of a database, a knowledge base, a text file, a spreadsheet, a table, a matrix, and a group of image files.

14. The method of claim 1, wherein the one or more data sources include information regarding life sciences reagents, and wherein the method further comprises:
performing one or more end-user-defined queries of data from the one or more data sources;
displaying an output of the one or more end-user-defined queries in the table such that each column of the table comprises a field of the output data, wherein the fields of the output data include two or more of: supplier, species detected, determinant, AKA, fluorochrome, color, SKU, and product URL, such that each row of the table includes information regarding a particular reagent;
receiving an end-user selection of at least one column in the table and, in response to the end-user selection, adding a node for each reagent contained in the selected at least one column to a first level of the customizable navigation tree;
receiving an end-user selection of at least one additional column in the table, and, in response to the end-user selection, creating an additional level of nodes corresponding to categories that relate to the reagents, the categories including a supplier, a species detected, a determinant, AKA, a fluorochrome, a color, an SKU, or a product URL; and
creating a preference list regarding an order of display of nodes in the customizable navigation tree based on an end-user specification of a preference.

15. The method of claim 1, wherein the one or more data sources include information regarding literary works, and wherein the method further comprises:
performing one or more end-user-defined queries of data from the one or more data sources;
displaying an output of the one or more end-user-defined queries in the table such that each column of the table comprises a field of the output data, wherein the fields of the output data include two or more of: author, title, publisher, publication date, edition, printing, male character or characters, female character or characters, and genre, such that each row of the table includes information regarding a particular literary work;
receiving an end-user selection of at least one column in the table and, in response to the user selection, adding a node for each distinct data entry in the selected at least one column to a first level of the customizable navigation tree, wherein each distinct data entry corresponding to a node is an author, a title, a publisher, a publication date, an edition, a printing, a male character, a female character, or a genre;
receiving an end-user selection of at least one additional column in the table, and in response to the end-user selection, creating an additional level of nodes corresponding to categories that relate to the distinct data entries in the first level of nodes; and
creating a preference list regarding an order of display of nodes in the customizable navigation tree based on an end-user specification of a preference.

16. The method of claim 1, wherein the one or more data sources include information regarding various movies, and wherein the method further comprises:
performing one or more end-user-defined queries of data from the one or more data sources;
displaying an output of the one or more user-defined queries in the table such that each column of the table comprises a field of the output data, wherein the fields of the output data include two or more of: title, year, producer, director, writer, actor or actors, genre, rating, runtime, and language, and such that each row of the table includes information regarding a particular movie;
receiving an end-user selection of at least one column in the table and, in response to the end-user selection, adding a node for each distinct data entry in the selected at least one column to a first level of the customizable navigation tree, wherein each distinct data entry corresponding to a node is a title, a year, a producer, a director, a writer, an actor or actors, a genre, a rating, a runtime, or a language;

receiving an end-user selection of at least one additional column in the table, and in response to the end-user selection, creating an additional level of nodes corresponding to categories that relate to the distinct data entries in the first level of nodes; and creating a preference list regarding an order of display of nodes in the customizable navigation tree based on an end-user specification of a preference.

17. The method of claim 1, wherein the one or more data sources include information regarding items for sale from a retailer, and wherein the method further comprises:

performing one or more end-user-defined queries of data from the one or more data sources;

displaying an output of the one or more end-user-defined queries in the table such that each column of the table comprises a field of the output data, wherein the fields of the output data include two or more of: size, color, pattern, cost, manufacturer, distributor, and domestic or foreign origin, such that each row of the table includes information regarding a particular item for sale;

receiving an end-user selection of at least one column in the table and, in response to the end-user selection, adding a node for each distinct data entry in the selected at least one column to a first level of the customizable navigation tree, wherein each distinct data entry corresponding to a node is a size, a color, a pattern, a cost, a manufacturer, or an indication of domestic or foreign origin;

receiving an end-user selection of at least one additional column in the table, and in response to the user selection, creating an additional level of nodes corresponding to categories that relate to the distinct data entries in the first level of nodes;

creating a preference list regarding an order of display of nodes in the customizable navigation tree based on an end-user specification of a preference; and creating a tab based on an end-user selection of a distinct data entry in the table, the tab including a second table displaying all items in a category corresponding to the selected distinct data entry.

18. The method of claim 1, wherein the one or more data sources include information regarding telephone numbers, and wherein the method further comprises:

performing one or more end-user-defined queries of data from the one or more data sources;

displaying an output of the one or more end-user-defined queries in the table such that each column of the table comprises a field of the output data, wherein the fields of the output data include two or more of: country, state, city, zip code, last name, first name, and telephone number;

receiving an end-user selection of at least one column in the table and, in response to the end-user selection, adding a node for each distinct data entry in the selected at least one column to a first level of the customizable navigation tree, wherein each distinct data entry corresponding to a node is a country, a state, a city, a zip code, a last name, or a first name;

receiving an end-user selection of at least one additional column in the table, and in response to the end-user selection, creating an additional level of nodes corresponding to categories that relate to the distinct data entries in the first level of nodes;

creating a preference list regarding an order of display of nodes in the customizable navigation tree based on an end-user specification of a preference; and creating a plurality of tabs based on a user selection of a column in the table for creation of tabs, each tab displaying information regarding telephone numbers belonging to a category corresponding to one of the distinct data entries in the user-selected column.

19. The method of claim 1, wherein the one or more data sources include information regarding patents and patent applications, and wherein the method further comprises:

performing one or more end-user-defined queries of data from the one or more data sources;

displaying an output of the one or more end-user-defined queries in the table such that each column of the table comprises a field of the output data, wherein the fields of the output data include two or more of: identification number, application number, country, inventor, applicant, assignee, filing date, related data, publication number, publication date, status, action due date, prior art references, and time worked, such that such that each row of the table includes information regarding a particular patent or patent application;

receiving an end-user selection of at least one column in the table and, in response to the end-user selection, adding a node for each distinct data entry in the selected at least one column to the customizable navigation tree, wherein each distinct data entry corresponding to a node is an identification number, an application number, a country, an inventor, an applicant, an assignee, a filing date, an item of related data, a publication number, a publication date, a status, an action due date, a prior art reference, or a time worked; and receiving an end-user selection of one or more nodes in the customizable navigation tree, and, in response to the end-user selection, selectively displaying information in the table or in a second table for patents or patent applications belonging to a category or categories corresponding to the one or more end-user-selected nodes.

20. A system for searching and organizing data obtained from one or more data sources according to parameters customized by an end-user, the system comprising:

storage configured to store data obtained from queries of the one or more data sources; and a computing device comprising a processor, the processor configured to execute executable code to provide a customizable graphical search interface configured to:

display a table including at least one row and a plurality of columns, wherein each column represents a data field of the stored data;

display a customizable navigation tree;

enable the end-user to add nodes to the customizable navigation tree and create levels of the customizable navigation tree by:

selection of at least one column from the plurality of columns in the displayed table by dragging the selected at least one column from the table to the navigation tree, or highlighting the at least one column in the displayed table and indicating a selection of the highlighted at least one column, or by selecting the at least one column from a drop-down list of columns displayed in the table that pops up from the table, and, in response to the end-user selection of the at least one column, creating at least one node in a first level of the customizable navigation tree for each distinct entry of data in the selected at least one column; and selection of at least one additional column from the plurality of columns in the displayed table by dragging the selected at least one additional column from the table to the navigation tree, or highlighting the at least one additional column in the displayed table and indicating a selection of the highlighted at least one additional column, or by selecting the at least one additional column from a drop-down list of columns displayed in the table that pops up from the table, and, in response to the end-user selection of the at least one additional column, creating at least one node in a second level of the customizable navigation tree for each distinct entry of data in the selected at least one additional column; and enable the end-user to control an order of display of nodes within each level of the customizable navigation tree; and enable optionally saving information regarding an end-user-specified organization of the customizable navigation tree;

wherein when saved, the saved information regarding the end-user-specified organization of the customizable navigation tree includes a saved node; and wherein the customizable graphical search interface is further configured to display a personalized search result of the one or more data sources or of one or more different data sources limited to the data field or data fields associated with the saved node upon an end-user selection of the saved node.

21. The system of claim 20, wherein the customizable graphical search interface is further configured to enable an end-user to apply the saved information regarding the end-user specified organization of the customizable navigation tree to second search results from updated queries of the one or more data sources to generate an end-user-customizable navigation tree including the second search results.

22. The system of claim 20, wherein the customizable graphical search interface is further configured to enable an end-user to apply the saved information regarding the end-user specified organization of the customizable navigation tree to second search results from an additional one or more queries of the one or more data sources or from one or more queries of one or more second data sources to generate an end-user-customizable navigation tree including the second search results.

23. The system of claim 20, wherein the customizable graphical search interface is further configured to enable an end-user to select a node of the customizable navigation tree to display a personalized search result of the one or more data sources limited to the data field or data fields associated with the node.

24. The system of claim 20, wherein the customizable graphical search interface is further configured to:

enable the end-user to specify a search query based on the stored data or based on selection of one or more nodes of the customizable navigation tree and submit the search query to one or more second data sources data sources, wherein the one or more second sources are the same as or different from the one or more sources;

display results of the search of the one or more second data sources in the table; and enable the end-user to organize the received search results of the one or more second data sources with previously stored data using the table and/or the customizable navigation tree.

25. The system of claim 20, wherein the one or more data sources include information regarding life sciences reagents;

wherein the customizable graphical search interface further comprises a control panel menu configured for end-user input of or end-user selection of information regarding a desired experimental use of a reagent or reagents, the information including one or more of the following: an instrument configuration, a species of animal cells that the reagent or reagents target, and whether antibodies are conjugated or unconjugated; and wherein the customizable graphical search interface restricts the data displayed in the table and the customizable navigation tree based on received information regarding the desired experimental use.

26. The system of claim 25, wherein the received information regarding the desired experimental use includes information regarding a flow cytometry instrument, and wherein the data displayed in the table and the customizable navigation tree is restricted based on the received information regarding the desired experimental use as determined by pre-set rules.

27. The system of claim 20, wherein the system is a flow cytometry reagent catalog and the one or more data sources include information regarding life sciences reagents;

wherein the processor is further configured to execute executable code to perform one or more end-user-defined queries of data from the one or more data sources;

wherein the fields of the stored data include two or more of: supplier, species detected, determinant, AKA, fluorochrome, color, SKU, and product URL;

wherein each row of the table includes information regarding a particular reagent;

wherein the customizable graphical search interface is configured to add a node to the first level of the customizable navigation tree for each reagent in response to the end-user selection of the at least one column from the plurality of columns in the displayed table; and wherein the customizable graphical search interface is configured to create a second level of nodes corresponding to categories that relate to the reagents in the first level of nodes based on the end-user selection of the at least one additional column from the plurality of columns in the displayed table, the categories including supplier, species detected, determinant, AKA, fluorochrome, color, SKU, or product URL.

28. The system of claim 20, wherein the one or more data sources include information regarding literary works;

wherein the processor is further configured to execute executable code to perform one or more end-user-defined queries of data from the one or more data sources;

wherein the fields of the stored data include two or more of: author, title, publisher, publication date, edition, printing, a male character or characters, a female character or characters, and genre;

wherein each row of the table includes information regarding a particular literary work;

wherein each distinct data entry corresponding to a node in the first level of the customizable navigation tree is an author, a title, a publisher, a publication date, an edition, a printing, a male character, a female character, or a genre; and wherein the nodes in the second level of the customizable navigation tree correspond to categories that relate to the first level of nodes, the categories including author, title, publisher, publication date, edition, printing, male character, female character, or genre.

29. The system of claim 20, wherein the one or more data sources include information regarding various movies;
   wherein the processor is further configured to execute executable code to perform one or more user-defined queries of data from the one or more data sources;
   wherein the fields of the stored data include two or more of: title, year, producer, director, writer, actor or actors, genre, rating, runtime, and language;
   wherein each row of the table includes information regarding a particular movie;
   wherein each distinct data entry corresponding to a node in the first level of the customizable navigation tree is a title, a year, a producer, a director, a writer, an actor, a genre, a rating, a runtime, or a language; and
   wherein the nodes in the second level of the customizable navigation tree correspond to categories that relate to the first level of nodes, the categories including year, producer, director, writer, actor, genre, rating, runtime, or language.

30. The system of claim 20, wherein the one or more data sources include information regarding various items for sale from a retailer;
   wherein the processor is further configured to execute executable code to perform one or more end-user-defined queries of data from the one or more data sources;
   wherein the fields of the stored data include two or more of: size, color, pattern, cost, manufacturer, distributor, and domestic or foreign origin;
   wherein each row of the table includes information regarding a particular item for sale;
   wherein each distinct data entry corresponding to a node in the first level of the customizable navigation tree is a size, a color, a pattern, a cost, a manufacturer, or an indication of domestic or foreign origin;
   wherein the nodes in the second level of the customizable navigation tree correspond to categories that relate to the first level of nodes, the categories including size, color, pattern, cost, manufacturer, distributor, or domestic or foreign origin; and
   wherein the customizable graphical search interface is further configured to receive an end-user selection of a distinct data entry in the table and, in response to the end-user selection, create a tab including a second table displaying all items in a category corresponding to the end-user-selected distinct data entry.

31. The system of claim 20, wherein the one or more data sources include information regarding telephone numbers;
   wherein the processor is configured to execute the executable code to perform one or more end-user-defined queries of data from the one or more data sources;
   wherein the fields of the stored data include two or more of: country, state, city, zip code, last name, first name, and telephone number;
   wherein each row of the table includes information regarding a particular telephone number;
   wherein each distinct data entry corresponding to a node in the first level of the customizable navigation tree is a country, a state, a city, a zip code, a last name, or a first name;
   wherein the nodes in the second level of the customizable navigation tree correspond to categories that relate to the first level of nodes, the categories including country, state, city, zip code, last name, first name, or telephone number; and
   wherein the customizable graphical search interface is further configured to receive an end-user selection of a column in the table for tab generation and, in response to the end-user selection of the column in the table for tab generation, create a plurality of tabs, each tab displaying information regarding telephone numbers belonging to a category corresponding to one of the distinct data entries in the end-user-selected column.

32. The system of claim 20, wherein the one or more data sources include information regarding patents and patent applications;
   wherein the processor is configured to execute the executable code to perform one or more end-user-defined queries of data from the one or more data sources;
   wherein the fields of the stored data include two or more of: identification number, application number, country, inventor, applicant, assignee, filing date, related data, publication number, publication date, status, action due date, prior art references, and time worked;
   wherein each row of the table includes information regarding a particular patent or patent application;
   wherein each distinct data entry corresponding to a node in the first level of the customizable navigation tree is an identification number, an application number, a country, an inventor, an applicant, an assignee, a filing date, an item of related data, a publication number, a publication date, a status, an action due date, a prior art reference, and a time worked; and
   wherein the customizable graphical search interface is further configured to receive an end-user selection of one or more nodes of the customizable navigation tree and, in response to the end-user selection of the one or more nodes, selectively display information in the table or in a second table for patents or patent applications belonging to a category or categories corresponding to the one or more end-user-selected nodes.

33. The system according to claim 20, wherein the customizable graphical search interface is further configured to enable the end-user to create at least one tab from at least one distinct data entry in at least one column.

34. The system according to claim 20, wherein the customizable graphical search interface is further configured to concatenate a plurality of the columns in the table into a string to create a tab.

35. The system according to claim 20, wherein the customizable graphical search interface is further configured to enable the end-user to abbreviate at least one distinct data entry in at least one column.

36. The system according to claim 20, wherein the customizable graphical search interface is further configured to store formats and information for acquiring search results created during a session on the computing device.

37. The system according to claim 20, wherein the customizable graphical search interface is further configured to store formats for acquiring search results created during a session on a client computer in communication with the computing device over a network.

38. The system according to claim 20, wherein the customizable graphical search interface is further configured to store formats for acquiring search results created during a session on the computing device and a client computer in communication with the computing device over a network.

39. The system according to claim 20, wherein the customizable graphical search interface is further configured to:

store formats for acquiring search results created during a session; and provide access to previously stored formats available in successive sessions.

40. The system according to claim 20, wherein the one or more data repositories are each selected from the group consisting of a database, a knowledge base, a text file, a spreadsheet, a table, a matrix, a group of image files, and any combination thereof.

41. A method for creating a user-customized navigation tree for selection of life sciences reagents by searching and organizing data collections from data sources according to parameters customized by an end-user, the method comprising:

enabling one or more queries of data from one or more data sources, the one or more data sources including information regarding life sciences reagents;

displaying search results from the one or more queries in a customizable graphical search interface that includes a table comprising at least one row and a plurality of columns, wherein each column comprises a data field of the search results;

displaying a customizable navigation tree using the customizable graphical search interface;

receiving information regarding a desired experimental use of a reagent or reagents through a control panel of the graphical search interface, the information including one or more of the following: an instrument configuration, a species of animal cells that the reagent or reagents target, and whether antibodies are conjugated or unconjugated;

restricting the data displayed in the table and the customizable navigation tree based on the received information regarding the desired experimental use;

enabling an end-user to add nodes to the customizable navigation tree and to create levels of the customizable navigation tree by:

receiving an end-user selection of at least one column from the plurality of columns in the displayed table, and, in response to the end-user selection of the at least one column, creating at least one node in a first level of the customizable navigation tree for each distinct entry of data in the selected at least one column, wherein the end-user selection of the at least one column is by dragging the selected at least one column from the table to the navigation tree, or by highlighting the at least one column in the displayed table and indicating a selection of the highlighted at least one column, or by selecting the at least one column from a drop-down list of columns displayed in the table that pops up from the table; and receiving an end-user selection of at least one additional column from the plurality of columns in the displayed table, and in response to the end-user selection of the at least one additional column, creating at least one node in a second level of the customizable navigation tree for each distinct entry of data in the selected at least one additional column, wherein the end-user selection of the at least one additional column is by dragging the selected at least one additional column from the table to the navigation tree, or by highlighting the at least one additional column in the displayed table and indicating a selection of the highlighted at least one additional column, or by selecting the at least one additional column from a drop-down list of columns displayed in the table that pops up from the table; and enabling the end-user to control an order of display of nodes within each level of the customizable navigation tree through the customizable graphical search interface;

optionally saving information regarding an end-user-specified organization of the customizable navigation tree; and when saved, applying the saved information regarding the end-user specified organization of the customizable navigation tree to second search results from additional one or more queries of the one or more data sources or from one or more queries of one or more second data sources to generate an end-user-customizable navigation tree including the second search results.

* * * * *